(12) United States Patent
Zhang et al.

(10) Patent No.: US 12,510,954 B2
(45) Date of Patent: Dec. 30, 2025

(54) PROCESSOR MICRO-ARCHITECTURE, SOC CHIP AND LOW-POWER-CONSUMPTION INTELLIGENT DEVICE

(71) Applicant: SPREADTRUM COMMUNICATIONS (SHANGHAI) CO., LTD., Shanghai (CN)

(72) Inventors: Huimin Zhang, Shanghai (CN); Guoming Rao, Shanghai (CN); He Yang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 126 days.

(21) Appl. No.: 18/288,627

(22) PCT Filed: Dec. 30, 2021

(86) PCT No.: PCT/CN2021/142830
§ 371 (c)(1),
(2) Date: Oct. 27, 2023

(87) PCT Pub. No.: WO2022/227671
PCT Pub. Date: Nov. 3, 2022

(65) Prior Publication Data
US 2024/0211020 A1    Jun. 27, 2024

(30) Foreign Application Priority Data

Apr. 30, 2021  (CN) .......................... 202110485283.3

(51) Int. Cl.
*G06F 1/3293*        (2019.01)
(52) U.S. Cl.
CPC .................................. *G06F 1/3293* (2013.01)
(58) Field of Classification Search
CPC .............................. G06F 9/5027; G06F 9/4881
See application file for complete search history.

(56) References Cited

U.S. PATENT DOCUMENTS

2009/0024834 A1*  1/2009  Kashiwagi ............ G06F 9/3867
                                                                    712/34
2012/0290763 A1   11/2012  Li
(Continued)

FOREIGN PATENT DOCUMENTS

| CN | 101667165 A | 3/2010 |
| CN | 102110072 A | 6/2011 |
| CN | 102402422 A | 4/2012 |

OTHER PUBLICATIONS

Mar. 9, 2022 International Search Report issued in International Patent Application No. PCT/CN2021/142830.
(Continued)

*Primary Examiner* — Hyun Soo Kim
(74) *Attorney, Agent, or Firm* — Harness, Dickey & Pierce, P.L.C.

(57) ABSTRACT

Disclosed in the present invention are a processor micro-architecture, an SoC chip and a low-power-consumption intelligent device. The processor micro-architecture comprises a co-processor and at least two main processors, wherein each main processor is connected to the co-processor by means of a request processing unit; the request processing unit is used for determining, when a usage request that is initiated by the two main processors has been received, a processing sequence for the main processors that initiate the request, and generating and sending a feedback instruction to different main processors according to the processing sequence; and the main processor is used for sending a processing instruction to the co-processor for processing when the feedback instruction represents that usage is allowed. A plurality of main controllers access the same co-processor in a shared manner, thereby satisfying an instruction-level delay, and achieving the optimum balance between performance and power consumption.

16 Claims, 4 Drawing Sheets

(56) References Cited

U.S. PATENT DOCUMENTS

2016/0092238 A1\* 3/2016 Codrescu .............. G06F 9/3877
                                                        712/200
2017/0161067 A1\* 6/2017 Henry ..................... G06F 8/447
2017/0177368 A1\* 6/2017 DeHon ............... G06F 12/1408
2019/0370060 A1\* 12/2019 Kang .................... G06F 9/5027
2020/0073714 A1\* 3/2020 Venkataraman ...... G06F 1/3296
2020/0097395 A1    3/2020 Beaudin et al.
2021/0049279 A1\* 2/2021 Zarakas ................. G06F 8/654
2021/0326135 A1\* 10/2021 Subbareddy ............ G06F 15/80

OTHER PUBLICATIONS

Mar. 9, 2022 Written Opinion of the International Searching Authority issued in International Patent Application No. PCT/CN2021/142830.

\* cited by examiner

Figure 7

PROCESSOR MICRO-ARCHITECTURE, SOC CHIP AND LOW-POWER-CONSUMPTION INTELLIGENT DEVICE

CROSS-REFERENCE TO RELATED APPLICATIONS

The present application is a National Stage Application under 35 U.S.C. 371 of International Application No. PCT/CN2021/142830, filed on Dec. 30, 2021, which claims the priority of Chinese patent application No. CN202110485283.3, filed on Apr. 30, 2021, the contents of which are incorporated herein by reference in their entirety.

TECHNICAL FIELD

The present disclosure relates to the field of intelligent terminal technology, and in particular to a processor micro-architecture, an SoC (System-on-Chip) chip and a low-power-consumption intelligent device.

BACKGROUND

Currently, in the system architecture design of a low-power-consumption intelligent terminal (such as a smart watch), multiple MCUs (Micro Control Units) need to be integrated into the chip to achieve the purpose of jointly realizing complex functions through multiple functional submodules, for instance, APCPU (application processor primary control system) for user application control, Sensor Hub (secondary control subsystem) for low-power-consumption control and sensor processing, Modem subsystem for wireless cellular communication, BTCPU subsystem (a subsystem) for Bluetooth connection and control.

In the traditional CPU (Central Processing Unit) architecture implementation, the Cortex-M (a processor micro-architecture) series micro-architecture authorization scheme is generally used as the MCU core implementation, but this approach brings several disadvantages: (1) MCU micro-architecture is not flexible enough: it can only be selected from optional MCU architectures, which often leads to over-performance or under-performance. For example, for the APCPU subsystem, a virtual memory system is required to extend the available address space; ARM MCU does not have MMU (Memory Management Unit), and cannot meet the requirement. The BTCPU subsystem requires the lowest power consumption, the shortest CodeSize and does not pursue higher performance, while ARM MCU is often constrained in many ways, and cannot adopt the most suitable MCU core. (2) The multi-processor core architecture cannot reach its optimal solution: for example, in a smart watch architecture, the APCPU, MMCPU (multimedia subsystem CPU) may both require AI processing acceleration ability. In the ARM MCU architecture, a DSP co-processor unit (SIMD, Single Instruction Multiple Data) is provided for each core, but DSP resource sharing cannot be realized, resulting in a waste. In addition, the main processor implements basic pipeline components and L1 Cache and other units, and the co-processor is designed independently based on requirements with a standard BUS interface; the main processor, co-processor, DDR (Double Data Rate) main memory, etc. are all mounted on the BUS (such as AXI). The benefits of such an architectural design lie in the design simplicity and the ability to extend the function of the co-processor quickly. But the disadvantages are that the BUS transmission delay is very large and the execution efficiency is very low, far from the instruction-level interaction delay and cannot meet high-performance requirements; (3) Customized instructions cannot be extended according to customers' requirements: The traditional ARM-based MCU can only process general instructions and cannot extend the instruction set according to customer's requirements.

CONTENT OF THE PRESENT INVENTION

A processor micro-architecture, an SoC chip and a low-power-consumption intelligent device are provided in order to overcome the defects of the prior art in which the processor micro-architecture either has a very low execution efficiency and is unable to achieve high performance, or is unable to realize the shared use of the co-processor, and the main processor is unable to be flexibly configured according to the actual business requirements, which is prone to cause the inability to realize the optimal performance or to cause an excessive performance of the micro-architecture.

The present disclosure solves the above technical problems through the following technical solutions:

The present disclosure provides a processor micro-architecture. The processor micro-architecture comprises a co-processor and at least two main processors; wherein each of the main processors is connected with the co-processor via a request processing unit;

the request processing unit is configured to determine, in response to receiving a use request initiated by at least two main processors, a processing sequence corresponding to each main processor initiating the request based on a first preset condition; and generate and send a feedback instruction to different main processors based on the processing sequence;

the main processor is configured to send a processing instruction to the co-processor for processing in response to the received feedback instruction indicating permission to use.

Preferably, the co-processor comprises an access interface and a co-processor unit;

the main processor is configured to send the processing instruction to the access interface;

the access interface is configured to transmit the processing instruction to the co-processor unit for processing;

wherein the request processing unit is independently arranged between the access interface and each of the main processors; or, the request processing unit is integrated in the access interface.

Preferably, the first preset condition comprises a preset processing priority corresponding to each of the main processors.

Preferably, the request processing unit is configured to: generate a first feedback instruction indicating permission to use and a second feedback instruction indicating continued waiting according to the processing sequence; send the first feedback instruction to the main processor with the highest ranking, and send the second feedback instruction to other lower-ranked main processors respectively.

Preferably, the request processing unit is further configured to: send the first feedback instruction to the next-ranked main processor, in response to the main processor being processed canceling initiating the use request, and send the second feedback instruction to other lower-ranked main processors respectively.

Preferably, each of the main processors corresponds to a different power domain; and/or, the access interface and the co-processor unit are divided into the same power domain.

Preferably, the main processor is configured to send the processing instruction to the access interface through a command stream; and/or, the co-processor unit is configured to determine to process the processing instruction in a blocking instruction processing mode in response to the processing instruction meeting a second preset condition; or, process the processing instruction in a pipelined instruction processing mode.

Preferably, the co-processor unit is configured to: execute an instruction processing operation based on target data, by sending an access request for data memory to the corresponding main processor in accordance with the processing instruction and reading the target data; the co-processor unit is further configured to: write-back a computed result of the instruction processing operation based on the target data, to an original register corresponding to the processing instruction, and write-back the computed result stored in the original register to a register of the main processor in response to receiving an instruction response from the main processor.

Preferably, the co-processor supports a user-defined instruction and/or a Vector instruction.

Preferably, the main processor comprises a plurality of configurable functional architectures, and each of the functional architectures is configured based on an open source instruction set architecture.

Preferably, the open source instruction set architecture includes an open source instruction set architecture RISC-V based on a reduced instruction set principle;

wherein the open source instruction set architecture RISC-V supports multiple instruction sets;

and a corresponding arithmetic logic unit and a pipeline architecture are configured according to each of the instruction sets.

Preferably, the instruction set comprises a basic instruction set, a floating-point instruction set, a compressed instruction set or an extension instruction set; and/or, the configured pipeline architecture supports a three-stage pipeline architecture or a five-stage pipeline architecture.

Preferably, the functional architecture comprises a multi-level memory structure.

Preferably, each level of memory architecture in the configured multi-level memory structure corresponds to multiple memories of different categories;

wherein the memory includes an L1 Cache, an I-Cache, a D-Cache, an I-TCM, a D-TCM (L1 Cache, I-Cache, D-Cache, I-TCM, and D-TCM are all one kind of memory) or an MMU.

Preferably, the main processor further comprises an extension interface and a vector extension unit; the vector extension unit is communicatively connected with the extension interface and a system bus respectively, and the vector extension unit is configured to extend the instruction set based on the extension interface and the system bus.

The present disclosure also provides an SoC chip. The SoC chip comprises the above-mentioned processor micro-architecture.

The present disclosure also provides a low-power-consumption intelligent device. The low-power-consumption intelligent device comprises the above-mentioned SoC chip.

Preferably, the low-power-consumption intelligent device includes a smart watch.

On the basis of common sense in the art, the above-mentioned preferred conditions can be arbitrarily combined to obtain the preferred embodiments of the present disclosure.

The positive progressive effects of the present disclosure are:

(1) Each main processor is connected with the request processing unit (i.e., arbitrator/arbitration unit), so that when a plurality of main processors simultaneously initiate requests for using the co-processor to the request processing unit, only one Ready signal is returned to one main controller CPU and a Hold signal is returned to the rest of the main controller CPUs respectively according to the preset priority setting. When the main controller CPU being processed cancels the use request, one Ready signal is returned to the next-ranked main controller CPU, and at the same time one Hold signal is returned to the remaining main controller CPUs respectively, and so on. That is, according to use scenarios, each main controller CPU sends a use request, and the arbitration unit realizes instruction-level mutually exclusive access, so that the co-processor can be used as a shared resource, and multiple main controller CPUs can share access to the same co-processor, thereby meeting the instruction-level delay requirement, achieving the best balance between performance and power consumption, and effectively improving resource utilization.

(2) The co-processor is realized by user-defined instructions and Vector instructions, which can realize data-level parallel processing. The instruction fetch unit and decode unit are realized by a unified CPU pipeline architecture. Instruction execution, data reading and write-back are completed by the co-processor, and instruction transmission and data access intercommunication with the main controller CPU are realized through a dedicated interface. In the CPU micro-architecture design, an open source CPU project, represented by RISC-V, allows users to add and design their own instructions according to business requirements to provide the best task processing ability.

(3) Each subsystem CPU (i.e., multiple main controllers) sharing the co-processor unit adopts the Harvard structure, which requires independent L1 I-Cache and L1 D-Cache, and the whole multi-core processor architecture realizes a unified L2 Cache. In addition, the co-processor accesses the L1 D-cache of the main controller through a dedicated interface.

(4) With low-power-consumption design, each main controller is divided into an independent power domain. The co-processor also adopts an independent power domain design. When the co-processor is not needed, the power can be explicitly cut off to improve sharing efficiency and reduce power consumption, which can better meet the performance-power ratio requirements of smart wearable devices.

(5) Different functional structures (such as a pipeline architecture, a memory architecture) can be flexibly configured and combined based on open source instruction set architecture RISC-V according to actual requirements, which can be used to realize the MCU requirements of multi-functional subsystems in a complex SoC system, thus providing a CPU micro-architecture that can be accurately configured, with adjustable functional characteristics, and with optimal performance and power consumption, meeting the customizable requirements of processor CPU micro-architecture, and further meeting the product configuration requirement of the low-power-consumption smart watch system.

DETAILED DESCRIPTION OF THE PREFERRED EMBODIMENT

The present disclosure is further described below through embodiments, but it is not limited to the scope of the embodiments.

Embodiment 1

The processor micro-architecture of this embodiment is applied in an SoC chip of a low-power-consumption intelligent device (such as a smart watch). The processor micro-architecture is the CPU micro-architecture of the low-power-consumption intelligent device. In the design of a wearable chip represented by a smart watch, based on different functional requirements, multiple main processors are designed to carry different system functions, such as APCPU for application processing, MMCPU for multimedia and camera control, and SPCPU for Sensor Hub.

Figure 1:
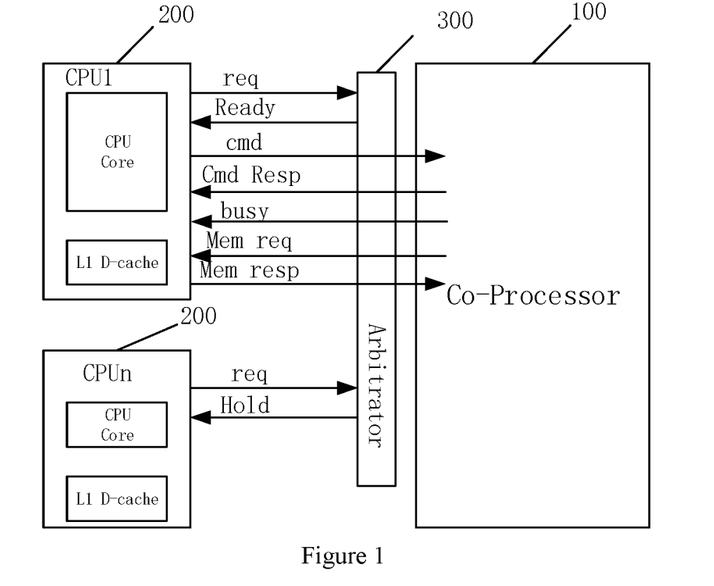
FIG. 1 is a first structural schematic diagram of a processor micro-architecture according to Embodiment 1 of the present disclosure.
Figure 2:
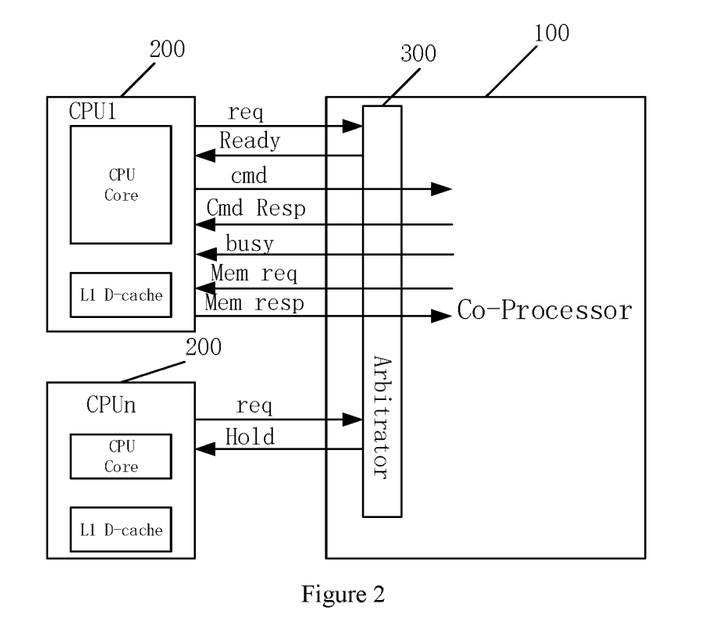
FIG. 2 is a second structural schematic diagram of the processor micro-architecture according to Embodiment 1 of the present disclosure.

As shown in FIGS. 1 and 2, the processor micro-architecture of this embodiment comprises a co-processor 100 and at least two main processors (CPU) 200. Each main processor 200 is connected to the co-processor 100 via a request processing unit 300 (also known as arbitrator/arbitration unit). The request processing unit is arranged between each main processor and the co-processor, or arranged in the co-processor.

Specifically, each main processor 200 is connected to the request processing unit 300 through a Req (request) line and a Response line. The number of Req lines and Response lines can be designed or adjusted according to the actual situation.

Each CPU is equipped with a CPU Core (processor core), an L1 D-Cache (a kind of memory), etc. The CPU sends a use request (req) and receives a feedback instruction (resp, including Ready/Hold), sends a processing instruction (cmd) and receives an instruction response (cmd resp) through the CPU Core; and receives Mem req (data request) and sends Mem resp (data response) through L1 D-Cache. Specifically, the request processing unit 300 is configured to: determine, in response to receiving a use request initiated by at least two main processors 200, a processing sequence corresponding to each main processor 200 initiating the request based on a first preset condition; and generate and send a feedback instruction to different main processors 200 based on the processing sequence;

wherein the first preset condition includes, but is not limited to, a preset processing priority corresponding to each main processor 200.

The main processor 200 is configured to send the processing instruction to the co-processor 100 for processing in response to the received feedback instruction indicating permission to use.

According to the requirements of usage scenarios, each subsystem CPU (i.e., main processor 200) sends a use request to use the co-processor 100 at the same time, and the arbitration unit realizes instruction-level mutually exclusive access, finally supporting multiple subsystem CPUs to share access to the same co-processor 100. Taking the co-processor 100 as a shared resource effectively improves the resource utilization rate.

In an implementable embodiment, the co-processor 100 supports an customized extension instruction and a Vector processing instruction. Taking a RISC-V instruction set as an example, it specifies the customized instructions that can be used for user extension and vector instructions. The co-processor 100 architecture is designed and implemented according to the specifications of these instruction sets, and can be used to process customized instructions and vector multiplication, vector addition, etc.

Figure 3:
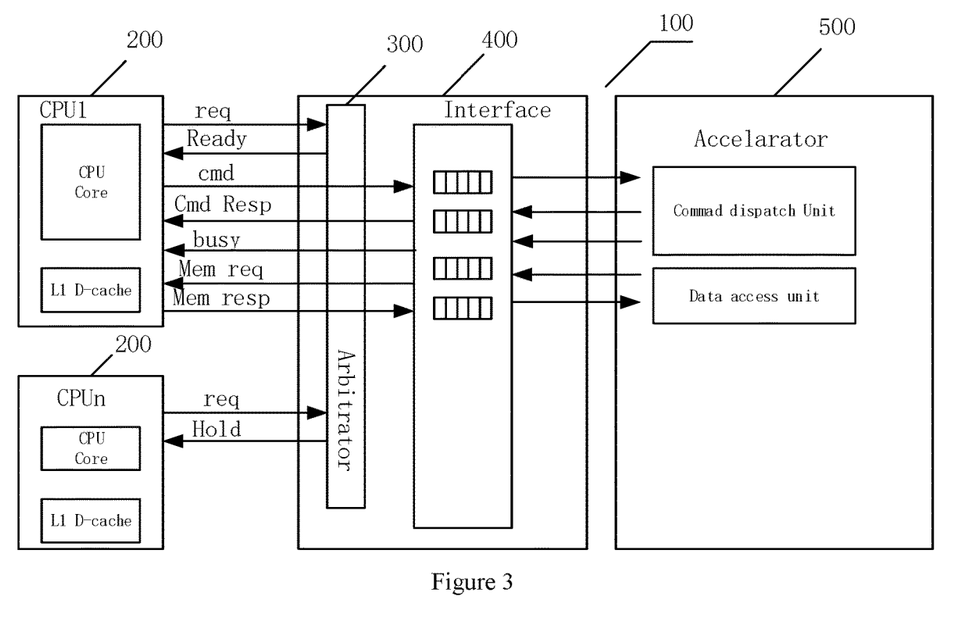
FIG. 3 is a third structural schematic diagram of the processor micro-architecture according to Embodiment 1 of the present disclosure.

As shown in FIG. 3, the co-processor 100 in this embodiment comprises an access interface 400 and a co-processor unit 500. The co-processor unit 500 is an accelerator, and specifically comprises a command dispatch unit and a data access unit, etc.

The main processor 200 is used to send the processing instruction to the access interface 400.

The access interface 400 is used to transmit the processing instruction to the co-processor unit 500 for processing.

In an implementable embodiment, the request processing unit 300 is independently arranged between the access interface 400 and each main processor 200. In an implementable embodiment, the request processing unit 300 is integrated in the access interface 400. Preferably, the request processing unit 300 is integrated in the access interface 400.

Specifically, the request processing unit 300 is configured to generate a first feedback instruction (such as a Ready signal) indicating permission to use and a second feedback instruction (such as a Hold signal) indicating continued waiting according to the processing sequence, and to send the first feedback instruction to the main processor 200 with the highest ranking, and to send the second feedback instruction to other lower-ranked main processors 200 respectively.

The request processing unit 300 is further configured to send the first feedback instruction to the next-ranked main processor 200 and send the second feedback instruction to other lower-ranked main processors 200 respectively in response to the main processor 200 being processed canceling initiating the use request.

In an implementable embodiment, the main processor 200 is configured to send the processing instruction to the access interface 400 through a command stream.

In an implementable embodiment, the co-processor unit 500 is configured to determine to process the processing instruction in a blocking instruction processing mode in response to the processing instruction meeting a second preset condition; or, process the processing instruction in a pipelined instruction processing mode.

Herein, the second preset condition corresponds to the category of the processing instruction. Specifically, according to the actual requirement, it can be set that a certain category of the processing instruction needs to be processed in the blocking instruction processing mode, and other certain category of the processing instruction needs to be processed in the pipelined instruction processing mode.

In the blocking instruction processing mode, after the main controller CPU sends an instruction, the co-processor 100 informs the corresponding main controller CPU through the access interface 400 by returning a Busy signal, and the main controller CPU cannot continue to send the remaining instructions until one instruction has been executed.

In the pipelined instruction processing mode, the main controller CPU can continuously send instructions in a flow without waiting.

The co-processor unit 500 is configured to: execute an instruction processing operation based on target data, by sending an access request for data memory to the corresponding main processor 200 in accordance with the processing instruction and reading the target data; the co-processor unit 500 is further configured to: write-back a computed result of the instruction processing operation based on the target data, to an original register corresponding to the processing instruction, and write-back the computed result stored in the original register to a register of the main processor 200 in response to receiving an instruction response from the main processor 200.

The instructions to be processed by the co-processor 100 include a user-defined instruction or a vector instruction. When the user-defined instruction contains a register value, the instruction will simultaneously transmit two source register values to the co-processor 100 through a dedicated channel. The co-processor 100 subsequently requests to access L1 D-cache data from the main processor 200 through a mem req request, and reads Mem data pointed by the register. The instruction delivery for accessing the Cache is performed via mem_req and mem_resp.

In addition, the co-processor 100 accesses the L1 D-cache of the main controller through a dedicated interface. In addition, each main processor 200 corresponds to a different power domain to enable independent power on and off of each main processor 200; and the access interface 400 and the co-processor unit 500 are divided into the same power domain. If the main processor 200 needs to use the co-processor 100, it is necessary to turn on the power switch of the co-processor 100 in advance.

That is, a low-power-consumption design is adopted in which each main controller is divided into an independent power domain and the co-processor 100 also adopts an independent power domain design. When the co-processor 100 is not needed, the power can be explicitly cut off to improve sharing efficiency and reduce power consumption, which can better meet the performance-power ratio requirement of a smart wearable device.

In addition, due to the extension of AI applications, the above main processors 200 all have a need for AI processing, and the vector co-processor 100 can provide AI computing abilities that meet the performance-power ratio.

Figure 4:
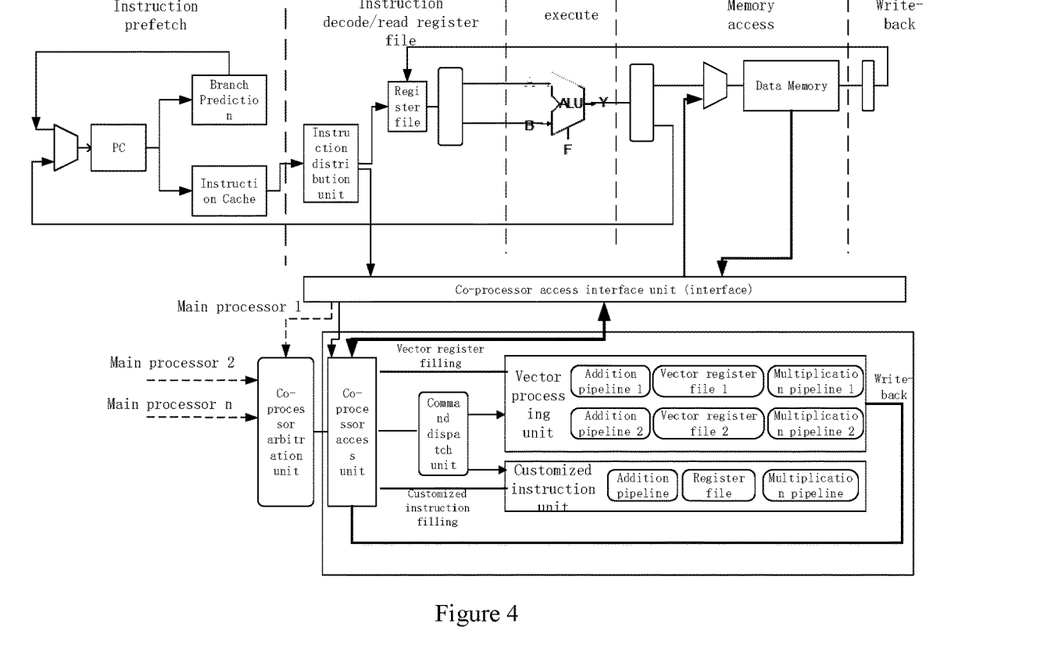
FIG. 4 is a schematic diagram of the principle framework of the processor micro-architecture according to Embodiment 1 of the present disclosure.

The working principle of the processor micro-architecture of this embodiment will be described in detail below with reference to FIG. 4:

(1) each main processor 200 generates an execution instruction through a program processor PC and sends the execution instruction to an instruction Cache (instruction memory), and then the execution instruction enters an instruction distribution queue. If the instruction is completed by the main processor 200 itself, it is distributed to the register file and ALU for execution to store the execution structure in the Data Memory; and if the instruction needs to be processed by the co-processor 100, a use request for the co-processor 100 is uniformly initiated to the request processing unit 300 (i.e., arbitrator) included in the access interface 400.

(2) n main processors 200 (CPU1, CPU2, . . . , CPUn) among the N main processors 200 simultaneously initiate a use request for the co-processor 100; (N, n are both positive integers and N≥n);

(3) The co-processor 100 generates a processing sequence based on the preset request response priorities of the n main processors 200, first returns a Ready signal to the top-ranked main processor 200, and returns a Hold signal to the other n−1 main processors 200 with lower rankings.

(4) The main processor 200 receiving the Ready signal transmits the processing instruction to the co-processor unit 500 of the co-processor 100 for processing through the access interface 400 in a command stream; wherein the processing instruction may be processed in a blocking or a pipelined mode.

The processing instruction passes through the co-processor 100 access unit and the command dispatch unit of the co-processor 100 in turn. The command dispatch unit determines whether the current processing instruction is a vector processing instruction or a user-defined instruction according to the set condition, and distributes the current processing instruction to the corresponding instruction unit for processing after determination.

Taking the vector processing unit as an example, the input processing instruction is analyzed and the write-back data request instruction is sequentially transmitted through the co-processor 100 access unit and the access interface 400 to access the Data Memory of the main processor 200 and read the corresponding target data, and then the vector register is filled through the access interface 400 and the co-processor 100 access unit to ensure that the vector processing unit obtains the instruction processing result based on the addition pipeline, vector register file, multiplication pipeline, etc., and finally the instruction processing result is stored into the Data Memory of the main processor 200 through the co-processor 100 access unit and the access interface 400.

The instruction processing principle of the user-defined co-processor unit 500 is similar to the instruction processing principle of the above-mentioned vector processing unit, and therefore will not be described again here.

(5) The instructions to be processed by the co-processor 100 may be user-defined instructions or vector instructions. When the user-defined instruction contains a register value, the instruction will simultaneously transmit two source register values to the co-processor 100 through a dedicated channel. The co-processor 100 subsequently requests to access L1 D-cache data from the main processor 200 through a mem req request, reads the Mem data pointed by the register, and the instruction delivery for accessing the Cache is performed via mem_req and mem_resp.

The co-processor unit 500 sends an access request for Data Memory to the corresponding main processor 200 in accordance with the processing instruction and reads the target data in order to perform an instruction processing operation based on the target data; and writes back a computed result of the instruction processing operation based on the target data to the original register corresponding to the processing instruction, and writes back the computed result stored in the original register to the register of the main processor 200 after receiving an instruction response from the main processor 200.

(6) If the main processor 200 currently being processed cancels initiating the use request, the request processing unit 300 returns a Ready signal to the main processor 200 ranked next and a Hold signal to the other n–2 main processors 200 ranked lower; and so on until the feedback of the Ready signals of all the main processors 200 is completed.

And so on until the processing operations of the processing instructions of the n main processors of CPU1, CPU2, . . . , and CPUn are completed, so as to realize the shared access of a plurality of main controllers to the same co-processor 100.

Figure 5:
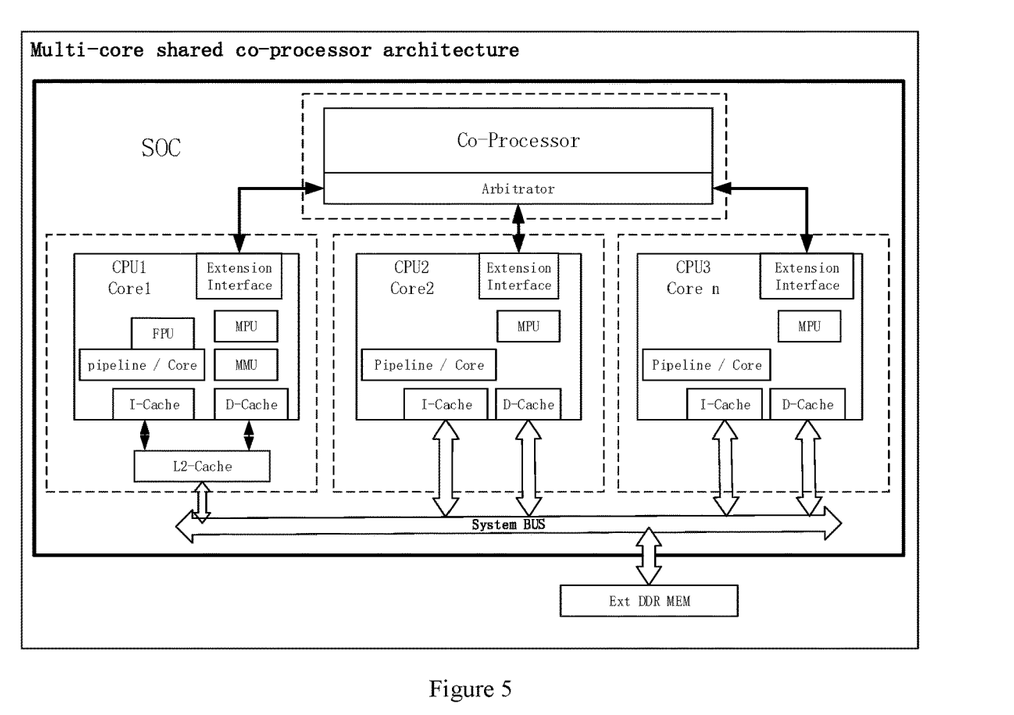
FIG. 5 is a fourth structural schematic diagram of the processor micro-architecture according to Embodiment 1 of the present disclosure.

In an implementable embodiment, in the multi-core shared co-processor architecture shown in FIG. 5, multiple main controllers sharing the co-processor 100 adopt a Harvard structure, which requires independent L1 I-Cache and L1 D-Cache, and the whole multi-core processor architecture realizes unified L2 Cache. Each main controller uses an extension interface to connect to the co-processor.

In this embodiment, each main processor is connected with the request processing unit, so that when a plurality of main processors simultaneously initiate requests for using the co-processor to the request processing unit, only one Ready signal is returned to one main controller CPU and a Hold signal is returned to the rest of the main controller CPUs respectively according to the preset priority setting. When the main controller CPU being processed cancels the use request, one Ready signal is returned to the next-ranked main controller CPU, and at the same time one Hold signal is returned to the remaining main controller CPUs respectively, and so on. That is, according to use scenarios, each main controller CPU sends a use request, and the arbitration unit realizes instruction-level mutually exclusive access, so that the co-processor can be used as a shared resource, and multiple main controller CPUs can share access to the same co-processor, thereby meeting the instruction-level delay requirement, achieving the best balance between performance and power consumption, and effectively improving resource utilization.

Embodiment 2

Figure 6:
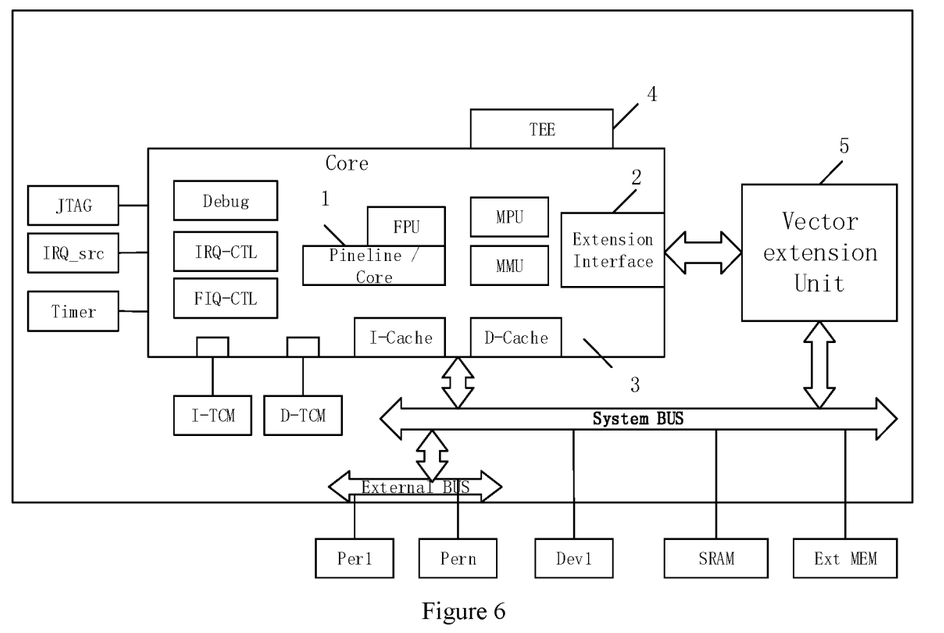
FIG. 6 is an architectural schematic diagram of a main processor in a processor micro-architecture according to Embodiment 2 of the present disclosure.

The processor micro-architecture of this embodiment is a further improvement of Embodiment 1, specifically:

As shown in FIG. 6, each main processor 200 in this embodiment includes multiple configurable functional architectures. The functional architectures include a pipeline architecture 1, an extension interface 2, a memory architecture 3 and a TEE 4 arranged in a main core (processor core), and a vector extension unit 5 arranged outside the main core. Each functional architecture is configured based on the open source instruction set architecture.

Herein, the open source instruction set architecture includes an open source instruction set architecture RISC-V based on the principle of reduced instruction set, which supports multiple instruction sets; the corresponding arithmetic logic unit and pipeline architecture are configured according to each instruction set.

The open source instruction set architecture RISC-V is used to carry out targeted design according to actual design requirements and flexibly match various functional architecture combinations for application in low-power-consumption intelligent devices to meet the different design needs of different customers and realize the customization requirements of processor micro-architecture.

The instruction set supported by the processor micro-structure include a basic instruction set, a floating-point instruction set, a compressed instruction set, an extension instruction set and so on. Herein, the basic instruction set includes instructions such as addition, subtraction, multiplication, division, amoswap, accessing memory; the floating-point instruction set includes single-precision and double-precision floating-point computing; the compressed instruction set includes the 16 bits' one; and the extension instruction set includes vector instructions and SIMD (single instruction multiple data) instructions, etc. Specifically, different ALUs (Arithmetic Logic Units) are designed according to the above different instruction sets, and different pipeline architectures are designed.

In addition, the processor micro-architecture of this embodiment includes an extension interface and a vector extension unit. The vector extension unit is communicatively connected to the extension interface and the system BUS respectively. The vector extension unit is used to extend the instruction set based on the extension interface and the system bus.

Specifically, the main core in the CPU processor micro-architecture design is used to support basic instruction sets, floating-point instruction sets and compressed instruction sets, etc., while the implementation of extension instruction sets needs to rely on the vector extension unit outside the main core. For example, the vector extension unit is used to process extension vector instructions, so that a logic unit with a better performance-power ratio can be used to handle the required domain computing requirements, that is, the user-defined optimization instruction set can be realized through the extension interface and the vector extension unit.

A special floating-point processing pipeline may be designed for the FPU (floating-point unit), adding a floating-point processing computation unit, which shares the instruction prefetching and decoding unit with the integer processing pipeline. It is certain that it can be chosen to support or not support floating-point processing instruction set according to the requirements of product configuration, which ensures the flexibility of configuration and better meets higher design requirements.

The functional architecture of this embodiment includes but is not limited to pipeline architecture, memory architecture, etc.

Specifically, the pipeline architecture is a multi-stage pipeline architecture, and the configured multi-stage pipeline architecture supports a three-stage pipeline architecture or a five-stage pipeline architecture. It is certain that a pipeline architecture of other stage can be used, and the configuration can be adjusted according to actual design requirements.

Figure 7:
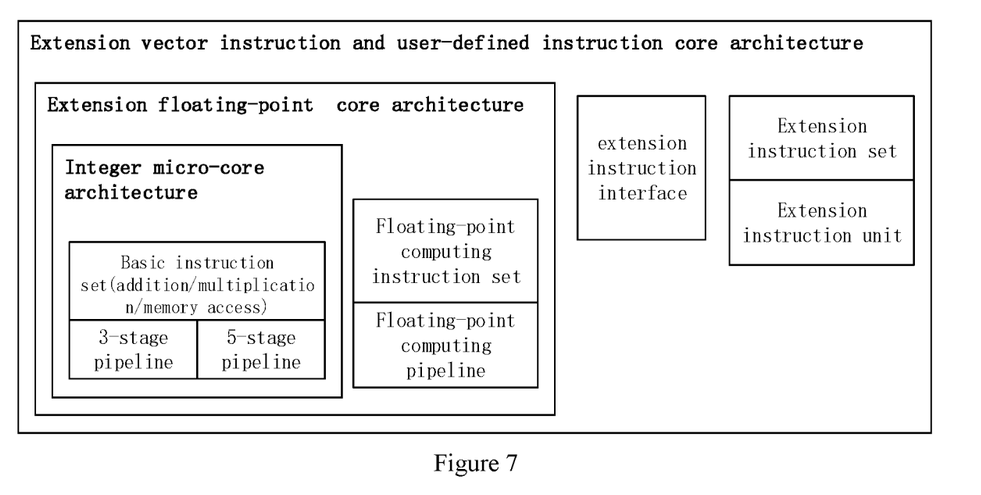
FIG. 7 is a schematic diagram of the framework of an extension vector instruction and a user-defined instruction core architecture according to Embodiment 2 of the present disclosure.

As shown in FIG. 7, a multi-stage pipeline architecture is designed based on the different implementation complexity. For example, a configurable multi-stage pipeline architecture is as follows: a classic 5-stage pipeline architecture is used in application processors with higher processing performance; in MCU controller design with lower processing performance but optimal power consumption area requirements, a simple 3-stage pipeline architecture is used; due to the basic principles of pipeline design, in the 3-stage pipeline, the highest supported main frequency is lower than that in the 5-stage pipeline, which sacrifices processing ability in exchange for the optimization of the chip area and power consumption.

Herein, this embodiment can form an independently configurable characteristic for an integer pipeline, a floating-point pipeline, a 3-stage pipeline, a 5-stage pipeline, etc., and it can be designed in a matching combination according to the complexity of the system.

The functional architecture includes multi-level memory structures. Each level of memory architecture in the configured multi-level memory structures corresponds to multiple memories of different categories;
wherein the memory includes L1 Cache, I-Cache, D-Cache, I-TCM, D-TCM or MMU.

The processor micro-architecture in this embodiment supports flexible configuration of memories such as L1 Cache, I-Cache, D-Cache, I-TCM, D-TCM or MMU. Combinations can be made according to different usage requirements, for example, in the AP application processor environment, I-Cache, D-Cache, L2 Cache, and MMU virtual memory, etc. need to be configured in combination; in the Sensor Hub with higher requirements for low-power-consumption, only I-Cache and D-TCM need to be configured in combination to meet the requirements.

The processor micro-architecture in this embodiment supports the MMU architecture. MMU is a memory management unit located between the CPU core and the external main memory, performs memory management by loading page tables and mainly implements the conversion of virtual addresses to actual physical addresses. The technique of virtual memory can be implemented through MMU, which is very effective in the embedded system (e.g., a smart watch) with insufficient extension memory. The MPU (microprocessor) enables access protection to the main memory space by different co-processor units 500 and different MCUs. As long as the main memory space is divided into different areas and the read/write permissions of the MPU are configured, requests for unauthorized access are effectively blocked.

In addition, the processor micro-architecture supports the trusted execution environment TEE.

The processor micro-architecture in this embodiment supports the implementation of TEE design and adopts privileged mode design. When special instructions are set, the system enters privileged mode. At this time, a trusted operating system is executed in a hardware environment that is completely isolated from the normal mode, including independent registers, independent and isolated storage spaces, independent and isolated devices and TOS (Trusted Operating System), etc.

For the SoC chip system, the Extension Interface in the CPU core in FIG. 1 represents the extension instruction interface, FIQ-CTL represents the fast interrupt request control module, IRQ-CTL represents the interrupt request control module, Debug represents the debugging module, JTAG represents the debugging interface, IRQ_src represents the interrupt response module, Timer represents the timing module. Per1, Pern, and Dev1 all represent the terminals connected to the bus, SRAM represents static random access memory, and Ext MEM represents a register.

The processor micro-architecture in this embodiment can undergo the above-mentioned instruction set design, pipeline design, register design, Cache design, extension instruction unit design, etc. Under the same conditions, the power consumption capability of the processor micro-architecture is bound to be superior to that of other existing CPU architecture implementations. For example, for the computing requirements of specific application scenarios (such as the heart rate detection function of a smart watch) that the processor micro-architecture of this embodiment corresponds to, compiling instructions using the existing ARM architecture may require multiple assembly instructions. However, the extension instruction of the redesigned processor micro-architecture in this embodiment can achieve the same function only by using a smaller number of instructions. Due to the reduction of the execution clock cycle, the corresponding power consumption is also optimized, and through the collocation and combination of the functional unit modules, as well as the user-defined extension instruction and other optimized designs, the chip area and the main working frequency are effectively reduced, thereby achieving the purpose of power consumption optimization.

For a complex embedded SoC system, such as an SoC design for a low-power-consumption smart watch, it is well suited to use the processor micro-architecture of this embodiment for modular combination and customized design. The following table shows the configuration data for each parameter in the SoC design of, for example, a low-power-consumption smart watch:

|  | Pipeline | Main frequency | FPU | MMU | TEE | Cache | TCM | Extension instruction |
|---|---|---|---|---|---|---|---|---|
| Primary control AP | 5-stage | 800 MHz | single precision | Yes | Yes | I/D | No | Vector Extension |
| Secondary control Sensor Hub | 3-stage | 96 MHz | No | No | No | I | D | No |
| BT subsystem | 3-stage | 128 MHz | No | No | No | I | D | No |
| Audio subsystem | 3-stage | 256 MHz | Single/ Double | No | No | No | I/D | No |

In this embodiment, the CPU micro-architecture in which multiple main processor CPUs share the same co-processor unit can be customized according to the customer requirements. At the same time, different functional structures (such as the pipeline architecture and memory architecture for implementing L1 Cache, L2 Cache, MMU, TEE, floating-point arithmetic logic unit, vector arithmetic logic unit) can be flexibly configured and combined based on open source instruction set architecture RISC-V according to the actual requirements, which can be used to realize the MCU requirements of multi-functional subsystems in a complex SoC system, thus providing a CPU micro-architecture that can be accurately configured, with adjustable functional characteristics, and with optimal performance and power consumption, meeting the customizable requirements for the processor CPU micro-architecture, and further meeting the product configuration requirements of a low-power-consumption smart watch system.

Embodiment 3

An SoC chip of this embodiment comprises the processor micro-architecture in Embodiment 1 or 2.

The SoC chip of this embodiment comprises the above-mentioned processor micro-architecture. The CPU micro-architecture in which multiple main processor CPUs share the same co-processor unit can be customized according to the customer requirements. At the same time, different functional structures can be flexibly configured and combined based on open source instruction set architecture RISC-V according to actual requirements, which can be used to realize the MCU requirements of multi-functional subsystems in a complex SoC system, thus providing a CPU micro-architecture that can be accurately configured, with adjustable functional characteristics, and with optimal performance and power consumption, meeting the customizable requirements for the processor CPU micro-architecture, and further meeting the product configuration requirements of a low-power-consumption smart watch system.

Embodiment 4

A low-power-consumption intelligent device of this embodiment comprises an SoC chip. Herein, the low-power-consumption intelligent device includes a smart watch.

The low-power-consumption intelligent device of this embodiment comprises the above-mentioned SoC chip. The CPU micro-architecture in which multiple main processor CPUs share the same co-processor unit can be customized according to the customer requirements. At the same time, different functional structures can be flexibly configured and combined based on open source instruction set architecture RISC-V according to actual requirements, which can be used to realize the MCU requirements of multi-functional subsystems in a complex SoC system, thus providing a CPU micro-architecture that can be accurately configured, with adjustable functional characteristics, and with optimal performance and power consumption, meeting the customizable requirements for the processor CPU micro-architecture, and further meeting the product configuration requirements of a low-power-consumption smart watch system.

Although detailed embodiments of the present disclosure have been described above, those skilled in the art will understand that these are only examples, and the protection scope of the present disclosure is defined by the appended claims. Those skilled in the art can make various changes or modifications to these embodiments without departing from the principles and essence of the present disclosure, but these changes and modifications all fall within the protection scope of the present disclosure.

What is claimed is:

1. A processor micro-architecture, comprising a co-processor and at least two main processors; wherein each of the main processors is connected with the co-processor via an arbitrator;

the arbitrator is configured to determine, in response to receiving a use request initiated by at least two main processors, a processing sequence corresponding to each main processor initiating the request based on a first preset condition; and generate and send a feedback instruction to different main processors based on the processing sequence;

the main processor is configured to send a processing instruction to the co-processor for processing in response to the received feedback instruction indicating permission to use;

wherein the main processor comprises a plurality of configurable functional architectures, and each of the functional architectures is configured based on an open source instruction set architecture;

wherein the main processor further comprises an extension interface and a vector extension unit; the vector extension unit is communicatively connected with the extension interface and a system bus respectively, and the vector extension unit is configured to execute a set of extension instructions defined by the open source instruction set architecture based on the extension interface and the system bus.

2. The processor micro-architecture according to claim 1, wherein the co-processor comprises an access interface and a co-processor unit;

the main processor is configured to send the processing instruction to the access interface;
the access interface is configured to transmit the processing instruction to the co-processor unit for processing;
wherein the arbitrator is independently arranged between the access interface and each of the main processors; or, the arbitrator is integrated in the access interface.

3. The processor micro-architecture according to claim 2, wherein each of the main processors corresponds to a different power domain; and/or,
the access interface and the co-processor unit are divided into the same power domain.

4. The processor micro-architecture according to claim 2, wherein the main processor is configured to send the processing instruction to the access interface through a command stream; and/or,
the co-processor unit is configured to determine to process the processing instruction in a blocking instruction processing mode in response to the processing instruction meeting a second preset condition; or, process the processing instruction in a pipelined instruction processing mode.

5. The processor micro-architecture according to claim 2, wherein the co-processor unit is configured to: execute an instruction processing operation based on target data, by sending an access request for data memory to the corresponding main processor in accordance with the processing instruction and reading the target data; the co-processor unit is further configured to: write-back a computed result of the instruction processing operation based on the target data, to an original register corresponding to the processing instruction, and write-back the computed result stored in the original register to a register of the main processor in response to receiving an instruction response from the main processor.

6. The processor micro-architecture according to claim 1, wherein the first preset condition comprises a preset processing priority corresponding to each of the main processors.

7. The processor micro-architecture according to claim 6, wherein the arbitrator is configured to: generate a first feedback instruction indicating permission to use and a second feedback instruction indicating continued waiting according to the processing sequence; send the first feedback instruction to the main processor with the highest ranking, and send the second feedback instruction to other lower-ranked main processors respectively.

8. The processor micro-architecture according to claim 7, wherein the arbitrator is further configured to send the first feedback instruction to the next-ranked main processor, in response to the main processor being processed canceling sending the use request, and send the second feedback instruction to other lower-ranked main processors respectively.

9. The processor micro-architecture according to claim 1, wherein the co-processor supports a user-defined instruction and/or a Vector instruction.

10. The processor micro-architecture according to claim 1, wherein the open source instruction set architecture comprises an open source instruction set architecture RISC-V based on a reduced instruction set principle; wherein the open source instruction set architecture RISC-V supports multiple instruction sets; and a corresponding arithmetic logic unit and a pipeline architecture are configured according to each of the instruction sets.

11. The processor micro-architecture according to claim 10, wherein the instruction set comprises a basic instruction set, a floating-point instruction set, a compressed instruction set or an extension instruction set; and/or, the configured pipeline architecture supports a three-stage pipeline architecture or a five-stage pipeline architecture.

12. The processor micro-architecture according to claim 1, wherein the functional architecture comprises a multi-level memory structure.

13. The processor micro-architecture according to claim 12, wherein each level of memory architecture in the configured multi-level memory structure corresponds to multiple memories of different categories;
wherein the memory comprises an L1 Cache, an I-Cache, a D-Cache, an I-TCM, a D-TCM or an MMU.

14. An SoC chip, comprising a processor micro-architecture, wherein the processor micro-architecture comprises a co-processor and at least two main processors; each of the main processors is connected with the co-processor via an arbitrator;
the arbitrator is configured to determine, in response to receiving a use request initiated by at least two main processors, a processing sequence corresponding to each main processor initiating the request based on a first preset condition; and generate and send a feedback instruction to different main processors based on the processing sequence;
the main processor is configured to send a processing instruction to the co-processor for processing in response to the received feedback instruction indicating permission to use; wherein the main processor comprises a plurality of configurable functional architectures, and each of the functional architectures is configured based on an open source instruction set architecture;
wherein the main processor further comprises an extension interface and a vector extension unit; the vector extension unit is communicatively connected with the extension interface and a system bus respectively, and the vector extension unit is configured to execute a set of extension instructions defined by the open source instruction set architecture based on the extension interface and the system bus.

15. A low-power-consumption intelligent device, comprising an SoC chip, wherein the SoC chip comprises a processor micro-architecture; the processor micro-architecture comprises a co-processor and at least two main processors; each of the main processors is connected with the co-processor via an arbitrator;
the arbitrator is configured to determine, in response to receiving a use request initiated by at least two main processors, a processing sequence corresponding to each main processor initiating the request based on a first preset condition; and generate and send a feedback instruction to different main processors based on the processing sequence;
the main processor is configured to send a processing instruction to the co-processor for processing in response to the received feedback instruction indicating permission to use;
wherein the main processor comprises a plurality of configurable functional architectures, and each of the functional architectures is configured based on an open source instruction set architecture;
wherein the main processor further comprises an extension interface and a vector extension unit; the vector extension unit is communicatively connected with the extension interface and a system bus respectively, and the vector extension unit is configured to execute a set of extension instructions defined by the open source instruction set architecture based on the extension interface and the system bus.

16. The low-power-consumption intelligent device according to claim 15, wherein the low-power-consumption intelligent device comprises a smart watch.

* * * * *